Patented Sept. 21, 1948

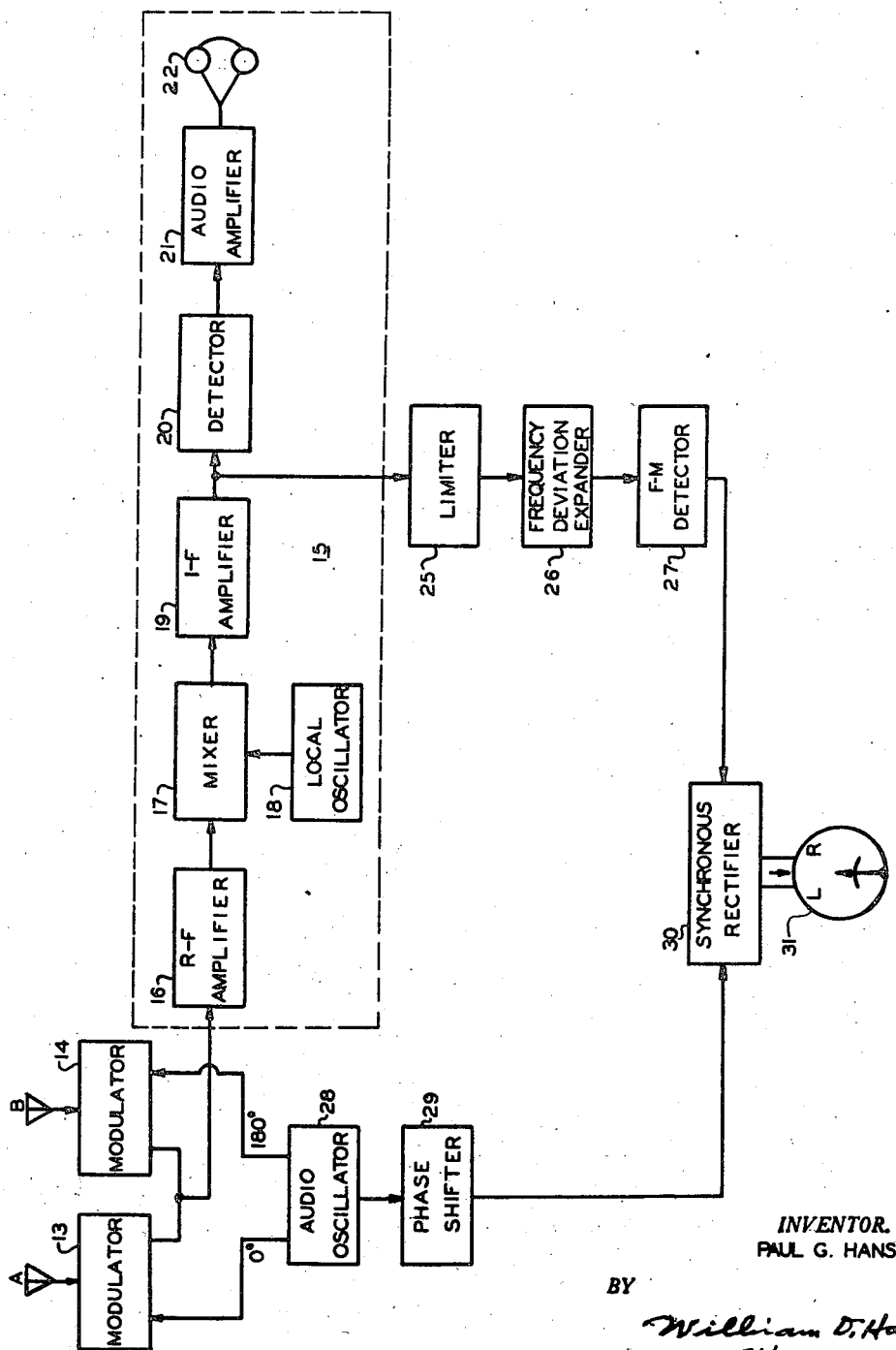

2,449,553

UNITED STATES PATENT OFFICE 2,449,553

RADIO COMPASS

Paul G. Hansel, Red Bank, N. J.

Application September 14, 1945, Serial No. 616,442

1 Claim. (Cl. 343—121)

(Granted under the act of March 3, 1883, as amended April 30, 1928; 370 O. G. 757)

The invention described herein may be manufactured and used by or for the Government for governmental purposes, without the payment to me of any royalty thereon.

My present invention provides a radio direction finder which has particular utility as a navigational aid or homing compass for aircraft and the like.

The primary purpose of this invention is to provide radio direction finder equipment which is largely free from the limitations and shortcomings which have characterized the conventional directional-antenna radio direction finders of prior art.

Aircraft radio direction finders in present-day commercial use employ a conventional loop antenna to determine direction and a non-directional antenna to resolve the 180° ambiguity of the figure-eight directivity pattern of the loop. The limitations of these direction finders have long been recognized. Some attempts have been made to overcome these limitations by installing conventional Adcock antenna systems on aircraft, but, except at very high frequencies, these attempts have been unsuccessful. It is now generally recognized that for low to medium-frequency use the conventional differentially-connected spaced-collector directional antenna systems cannot readily be applied to aircraft direction finders.

It is therefore one of the objects of this invention to provide a spaced-collector direction finder wherein the mode of operation does not require any directive properties in the antenna system.

It is another object of the invention to provide a spaced-aerial direction finder which is capable of use on a small craft or the like.

For a better understanding of the invention, together with other and further objects thereof, reference is had to the following description taken in connection with the single figure of the accompanying drawing, which shows a block diagram of the invention.

In the drawing, there are shown two spaced non-directional antennas A and B which abstract from the received wave two signals differing in phase as a function of the direction of wave arrival. The two signals abstracted by antennas A and B are then amplitude-modulated independently by modulators 13 and 14 driven in opposite phase, at a low frequency rate, preferably, but not necessarily, in a sinusoidal fashion by the push-pull output of an audio oscillator 28. The two amplitude-modulated signals thus obtained are then combined to produce a phase-modulated resultant signal. The amplitude of this phase-modulated resultant signal is substantially independent of the direction of arrival so long as the physical spacing between the antennas is small compared to the wavelength of the received signal under consideration.

The phase-modulated resultant signal is then applied to a receiver 15 wherein it is detected, preferably as an equivalent frequency-modulated signal, to obtain a low frequency signal whose amplitude and sense are dependent upon the direction of arrival. This low frequency signal is then applied to an indicator, which may comprise a conventional synchronous detector and left-right meter, to produce directional indications.

The operation of this direction finder will now be described in greater detail. Assume that antennas A and B are mounted on the right and left wings, respectively, of an aircraft. The radio frequency field (E) existing at a point which is midway between antennas A and B, may be denoted by the equation:

$$E = E_m \sin \omega_c t \qquad (1)$$

where $E_m$ is the maximum amplitude and $\omega_c$ is the angular frequency of the received signal.

The signal voltages $e_A$ and $e_B$ induced in antennas A and B, respectively, may then be represented by the equations:

$$e_A = E_m h_e \sin\left(\omega_c t + \frac{\pi d}{\lambda} \sin \alpha\right) \qquad (2)$$

$$e_B = E_m h_e \sin\left(\omega_c t - \frac{\pi d}{\lambda} \sin \alpha\right) \qquad (3)$$

where:

$h_e$ = the effective height of each antenna,
$d$ = the distance between antennas,
$\lambda$ = the wavelength of the received signal, and
$\alpha$ = the direction of wave arrival measured clockwise with respect to the craft's heading.

The signals $e_A$ and $e_B$ are applied to modulators 13 and 14, respectively. The modulator outputs are then combined and applied to the input of receiver 15. The resultant signal at the receiver input is, therefore, the vector combination of the two amplitude modulated component signals $e'_A$ and $e'_B$ represented by the following equations:

$$e'_A = k(1 + a \sin \omega_M t) \sin\left(\omega_c t + \frac{\pi d}{\lambda} \sin \alpha\right) \quad (4)$$

$$e'_B = k(1 - a \sin \omega_M t) \sin\left(\omega_c t - \frac{\pi d}{\lambda} \sin \alpha\right) \quad (5)$$

where:

$k$ = a constant,
$a$ = the amplitude-modulation factor, and
$\omega_M$ = angular frequency of the low-frequency modulating oscillator 28.

After expansion Equations 4 and 5 may be simplified by employing the following approximations:

$$\cos\left(\frac{\pi d}{\lambda} \sin \alpha\right) \cong 1 \quad (6)$$

and $$\sin\left(\frac{\pi d}{\lambda} \sin \alpha\right) \cong \frac{\pi d}{\lambda} \sin \alpha \quad (7)$$

These approximations are permissible since $$\frac{\pi d}{\lambda}$$

is always small in any practical case.

The resultant signal at the input of receiver 15 may therefore be represented adequately by approximate equations of the form:

$$e_R \cong 2k\left(\sin \omega_c t + \frac{a\pi d}{\lambda} \sin \alpha \sin \omega_M t \cos \omega_c t\right) \quad (8)$$

$$e_R \cong 2k \sin\left(\omega_c t + \frac{a\pi d}{\lambda} \sin \alpha \sin \omega_M t\right) \quad (9)$$

The approximate Equation 9 neglects the small amount of amplitude modulation present in the resultant signal. It is apparent from Equation 9 that this resultant signal is phase modulated at the modulating frequency of oscillator 28 to an extent determined by the direction of wave arrival.

The resultant signal, $e_R$, is passed through a superheterodyne receiver 15 which includes an R-F amplifier 16, mixer 17, local oscillator 18, intermediate-frequency amplifier 19, and a monitoring channel comprising a detector 20, which may be designed to demodulate either amplitude modulated or frequency modulated waves, an audio amplifier 21, and headphones 22.

Part of the signal output of I-F amplifier 19 is demodulated to produce a signal of the modulating frequency from which directional information can be obtained. Now, since this signal is phase modulated, it could be demodulated in a phase modulation detector. However, as is well known, phase modulation detectors are rather unstable and critical to adjust. It is preferable therefore to detect the phase modulated signal as an equivalent frequency-modulated signal.

Accordingly, this signal is passed through a limiter 25 to remove any amplitude modulation which may be present, then passed through a frequency-deviation expander 26 to produce a satisfactorily-high degree of frequency modulation, and finally is detected in a conventional frequency modulation detector 27. The output of the frequency modulation detector 27 is applied through a synchronous rectifier 30 to a conventional left-right meter 31.

Part of the output from the oscillator 28 is applied to the synchronous rectifier 30 through a 90° phase shifter 29. The phase shifter is provided to compensate for the 90° phase shift of the modulation which exists when a phase modulated signal is detected as an equivalent frequency modulated signal. The amplitude and sense of the detector output signal are compared with the output of oscillator 28 in synchronous rectifier 30 and indicated in meter 31.

The functional elements shown only as blocks may take any one of the well-known conventional forms. The frequency-deviation expander 26 may be of the type used in the well-known Armstrong frequency modulation system, wherein the phase-modulated signal is frequency-multiplied, and then heterodyned down to a lower mean frequency. This process may be repeated several times until a signal having the desired mean frequency and degree of frequency deviation is obtained.

It will be apparent from the foregoing that I have provided a novel radio direction finder employing spaced collector elements which need not be directional in themselves and the outputs of which are so combined that no significant directional antenna pattern is produced in combination.

It will also be apparent to those skilled in the direction finding art that I have provided a novel direction finding method wherein the signals derived by a plurality of spaced wave collectors are amplitude-modulated and the resulting amplitude-modulated component signals combined to produce a resultant signal characterized by directionally-dependent phase modulation, and wherein novel means is provided whereby resultant phase modulated signal is translated into directional information.

This method can of course be employed in direction finders of a much more elaborate form than the simple left-right radio compass illustrated in the drawing. For example, direct reading direction finders can be designed which employ four or more spaced collectors associated in pairs. Crossed-pointer presentation of directional information or any one of several well-known forms of cathode-ray tube presentation can then be used.

While there has been described what is at present considered a preferred embodiment of my invention, it will be obvious to those skilled in the art that various changes and modifications may be made therein without departing from the invention, and it is aimed in the appended claim to cover all such changes and modifications as fall within the true spirit and scope of the invention.

I claim:

A radio system comprising a plurality of spaced, non-directional aerials, a low-frequency sine-wave oscillator for independently modulating in opposite phase the respective outputs of said aerials, means for combining the modulated waves to derive a resultant phase-modulated wave, a signal-monitoring channel and a compass channel excited in parallel by said resultant wave, said compass channel comprising means for limiting the amplitude and expanding the degree of phase modulation of said resultant wave, a frequency-modulation detector connected to the output of said last named means for deriving a sine wave having a frequency equal to that of the output of said oscillator and a phase relative to said output which is dependent upon the direction and sense of arrival of the received wave, means to shift the phase of the output of said oscillator 90° to derive a second sine wave, a synchronous rectifier energized by said sine waves for deriving a direct current having a polarity and magnitude dependent upon the phase relation of said sine waves, and a polarized direct-current indicator energized by said current.

PAUL G. HANSEL.

REFERENCES CITED

The following references are of record in the file of this patent:

UNITED STATES PATENTS

| Number | Name | Date |
| --- | --- | --- |
| 1,946,308 | Chireix | Feb. 6, 1934 |
| 2,188,556 | Nickel | Jan. 30, 1940 |
| 2,213,874 | Wagstaffe | Sept. 3, 1940 |
| 2,305,614 | Goldstein | Dec. 22, 1942 |
| 2,403,727 | Loughren | July 9, 1946 |
| 2,405,203 | Goldstein | Aug. 6, 1946 |